US006783815B2

(12) United States Patent
Flohe

(10) Patent No.: US 6,783,815 B2
(45) Date of Patent: Aug. 31, 2004

(54) ORNAMENTAL DEVICE

(76) Inventor: Timothy J. Flohe, 445 Eagle Dr., Middleville, MI (US) 49333

( * ) Notice: Subject to any disclaimer, the term of this patent is extended or adjusted under 35 U.S.C. 154(b) by 0 days.

(21) Appl. No.: 10/051,484

(22) Filed: Jan. 18, 2002

(65) Prior Publication Data

US 2003/0138575 A1 Jul. 24, 2003

(51) Int. Cl.7 .................................................. B32B 9/00
(52) U.S. Cl. ............................. 428/11; 428/12; 428/15; 428/542.2; 428/542.6
(58) Field of Search ............................... 428/11, 12, 15, 428/542.2, 542.8, 542.6; D11/131, 157

(56) References Cited

U.S. PATENT DOCUMENTS

| | | | | |
|---|---|---|---|---|
| 1,162,230 | A | 11/1915 | Foster | |
| 2,395,578 | A | 2/1946 | Pergande | |
| 4,746,022 | A | 5/1988 | Benham | |
| 5,130,169 | A | 7/1992 | DeJaynes | |
| 5,336,536 | A | 8/1994 | Oberzan | |
| 6,042,903 | A | 3/2000 | Yedlin et al. | |
| 6,048,590 | A | 4/2000 | Phillips | |
| 6,139,168 | A | 10/2000 | Gary et al. | |
| 6,200,656 | B1 | 3/2001 | Tsang | |
| D472,183 | S | 3/2003 | Flohe | D11/131 |

OTHER PUBLICATIONS

Photograph published at Metalstreet.com dated Aug. 24, 2000 (one page).

*Primary Examiner*—Deborah Jones
*Assistant Examiner*—Abraham Bahta
(74) *Attorney, Agent, or Firm*—Price, Heneveld, Cooper, DeWitt & Litton, LLP

(57) ABSTRACT

A three-dimensional ornamental device adapted for rotation about an axis to produce a changing perspective that creates an interesting visual effect includes a series of angularly spaced apart strips, each strip having opposite ends and a length corresponding to the curvilinear distance along the strip between the opposite ends of the strip, wherein each strip is connected at one end to a first spine and connected at an opposite end to a second spine. The device can be made by cutting a sheet of material into a desired geometric shape, making cuts into the sheet material to form a series of disconnected adjacent strips, and bending the strips from a reference plane so that the strips are angularly spaced apart from each other.

9 Claims, 6 Drawing Sheets

ORNAMENTAL DEVICE

FIELD OF THE INVENTION

This invention relates to three-dimensional decorative devices created from sheet material, and more particularly to three-dimensional decorative devices created from flat sheet material which are suspended or mounted to allow rotation of the decorative device, and to a process for making a decorative three-dimensional device from a flat sheet of material.

BACKGROUND OF THE INVENTION

Various three-dimensional decorative objects have been created from sheet material. Such objects have included artificial trees, Christmas tree ornaments, and other devices.

The artificial trees are generally comprised of a circular sheet of material that is spirally cut and vertically deformed to create a helical structure that bears some resemblance to a conically-shaped tree. Examples of this type of structure are described in U.S. Pat. Nos. 6,048,590 and 5,336,536.

A variation of the basic conical helix tree is described in U.S. Pat. No. 6,139,168, which discloses bridges that maintain a predetermined spacing between portions of the helical strip forming the tree. While each of the artificial trees described in these patents could conceivably be mounted for rotation, they are not adapted for rotational mounting and would not likely be expected to provide an interesting visual effect if they were rotated.

Other somewhat more elaborate structures constructed from flat sheet material are described in U.S. Pat. Nos. 6,200,656 B1 (Tsang) and 4,746,022 (Benham). The Tsang patent describes an artificial tree having a central disc-shaped member, a plurality of vertically spaced apart annular rings connected to the central disc-shaped member, and a plurality of connecting strips that connect each of the vertically spaced apart annular rings to an adjacent annular ring. The Benham patent describes a three-dimensional support structure that may be either free standing or adapted to be hung from an overhead support. The structure includes a plurality of radially spaced concentric rings, and elongated flexible connectors that join the concentric rings in axially displaced relationship to form a conically shaped framework.

Neither the structure of the Tsang patent nor the structure of the Benham patent are adapted to be mounted for rotational movement. As with the previously described artificial trees generally defined by a helical strip, the structures of Tsang and Benham would not be expected to provide an interesting visual effect if rotated. In particular, the elevational view of these structures is very similar from all sides, with the result being that rotation of these structures would not be expected to provide a changing perspective capable of generating an interesting visual effect.

A suspendable Christmas trees ornament is described in U.S. Pat. No. 6,042,903. The ornament is fabricated from sheet material by cutting parallel slits in the sheet material to form a plurality of narrow adjacent strips. The cut sheet material is wound around a core comprising an inner cylindrical member telescopingly mounted within a through hole of an outer cylindrical member. After the sheet material is secured along its edges to the core, the core is shortened to change the shape of the sheet material from a tubular configuration to a globular configuration. The ornament is not adapted for rotation, and would not be expected to provide a changing perspective that generates an interesting visual effect if the ornament were rotated.

Other ornamental novelty and display devices made from sheet material are shown in U.S. Pat. Nos. 1,162,230; 2,395,578 and 5,130,169. None of these devices are adapted for rotation, and would not be expected to provide a changing perspective that could generate an interesting visual effect if the devices were rotated.

SUMMARY OF THE INVENTION

The three-dimensional ornamental device of this invention may be adapted for rotation about an axis whereby a changing perspective creates an interesting visual effect.

The device includes a series of angularly spaced apart strips, each strip having opposite ends and a length corresponding to the curvilinear distance along the strip between the opposites ends of the strip, each strip connected at one end to a first spine and connected at the opposite end to a second spine.

In accordance with a particular aspect of the invention, a second series of angularly spaced apart strips is provided, wherein each strip has opposites ends and a length corresponding to the curvilinear distance along the strip between opposite ends of the strip, and each strip is connected at one end to the first spine and at the opposite end to the second spine. Each strip in the first series corresponds with one of the strips in the second series. The corresponding pairs of strips are annularly displaced by about 180 degrees and connected on opposite sides of the spines to outline two sides of a geometric shape separated by the spines.

These and other features, advantages and objects of the present invention will be further understood and appreciated by those skilled in the art by reference to the following specification, drawings and claims.

DESCRIPTION OF THE PREFERRED EMBODIMENTS

Figure 1:
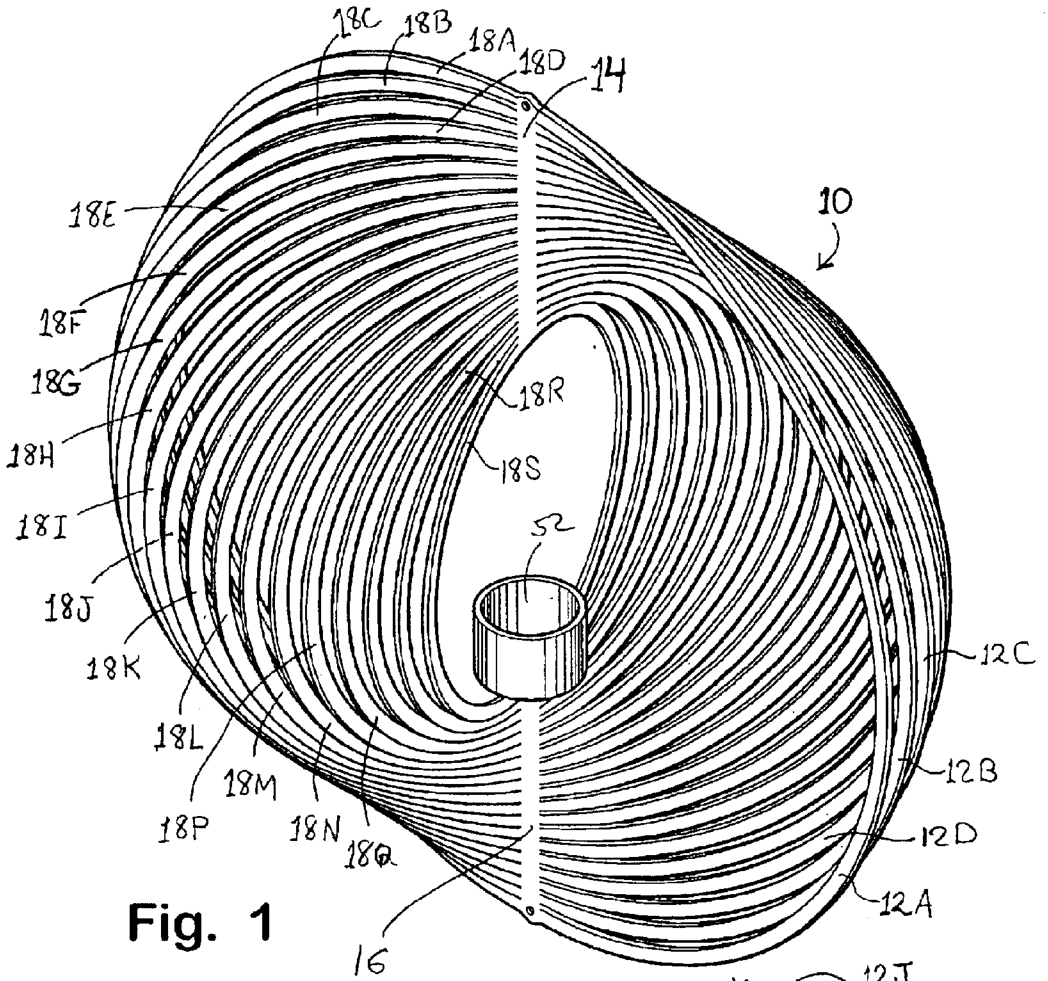
FIG. 1 is a perspective view of a first embodiment of a three-dimensional ornamental device in accordance with invention.
Figure 2:
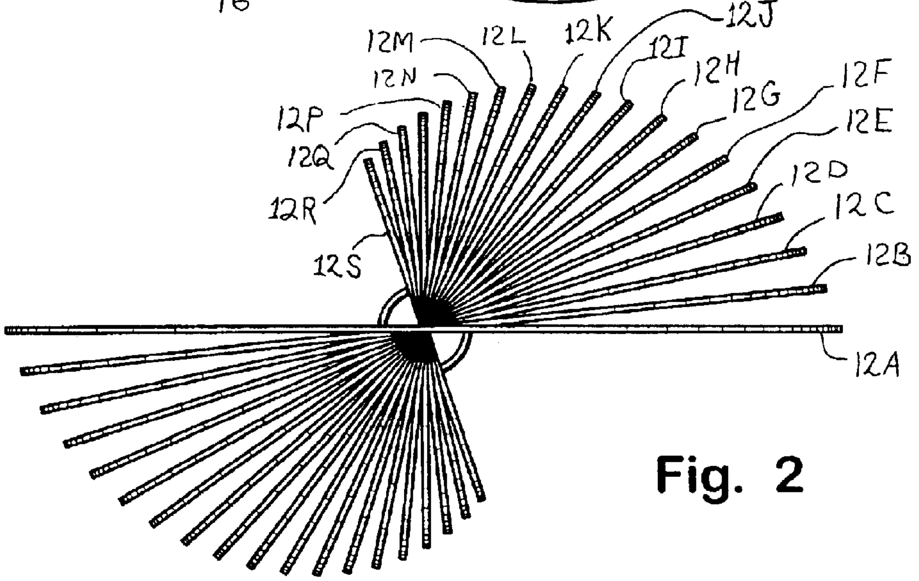
FIG. 2 is a top plane view of the device shown in FIG. 1.
Figure 3:
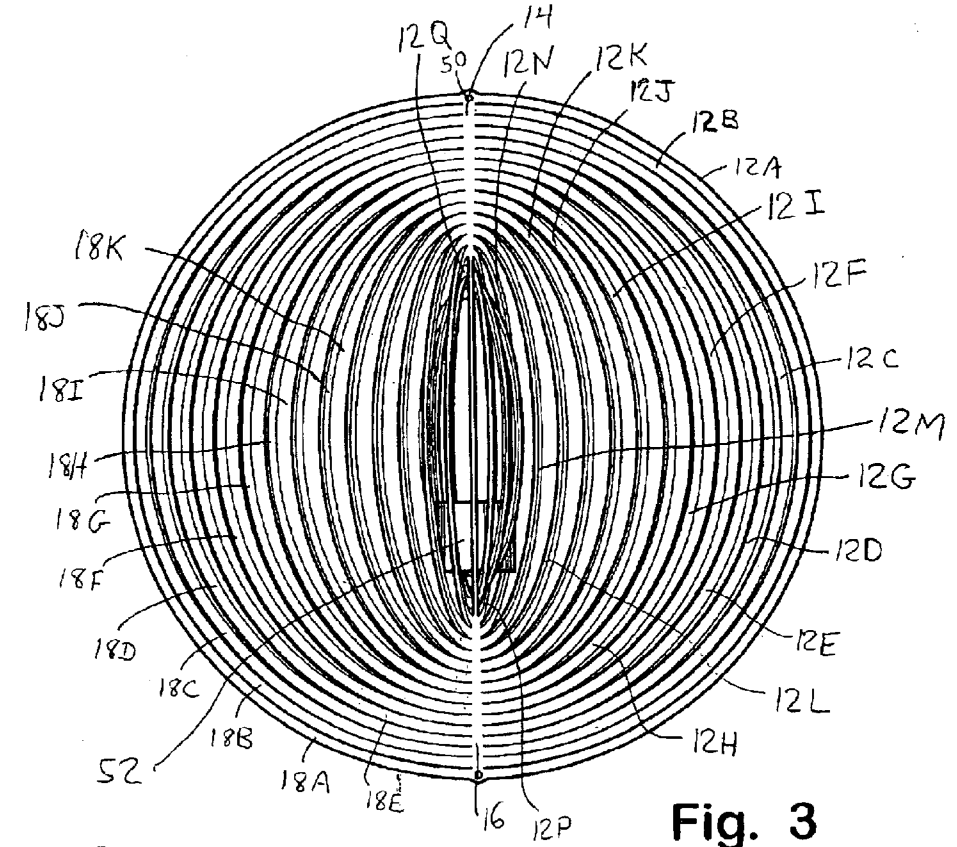
FIG. 3 is a side elevational view of the device shown in FIG. 1.

A first embodiment of a three-dimensional ornamental device 10 in accordance with the invention is shown in FIGS. 1–3. Device 10 includes a plurality of angularly spaced apart ribs or strips 12A through 12S, each of which is connected at a first end to an upper spine 14, and connected at the other end to a lower spine 16.

As can be most easily seen by reference to FIG. 2, each of the strips 12A through 12S is angularly displaced from an adjacent strip. In other words, each of the strips 12A through 12S is located in a different vertical plane, all of which approximately intersect at a vertical line coincident with the longitudinal direction of spines 14 and 16. The 19 strips 12A through 12S of device 10 are arranged in a series with each strip angularly displaced with respect to an adjacent strip by about 6 degrees. However, the angular spacing between strips 12A through 12S may be somewhat greater or somewhat smaller, and need not necessarily be uniform in order to create a varying perspective that creates an interesting and/or appealing visual effect when the device is rotated.

Figure 4:
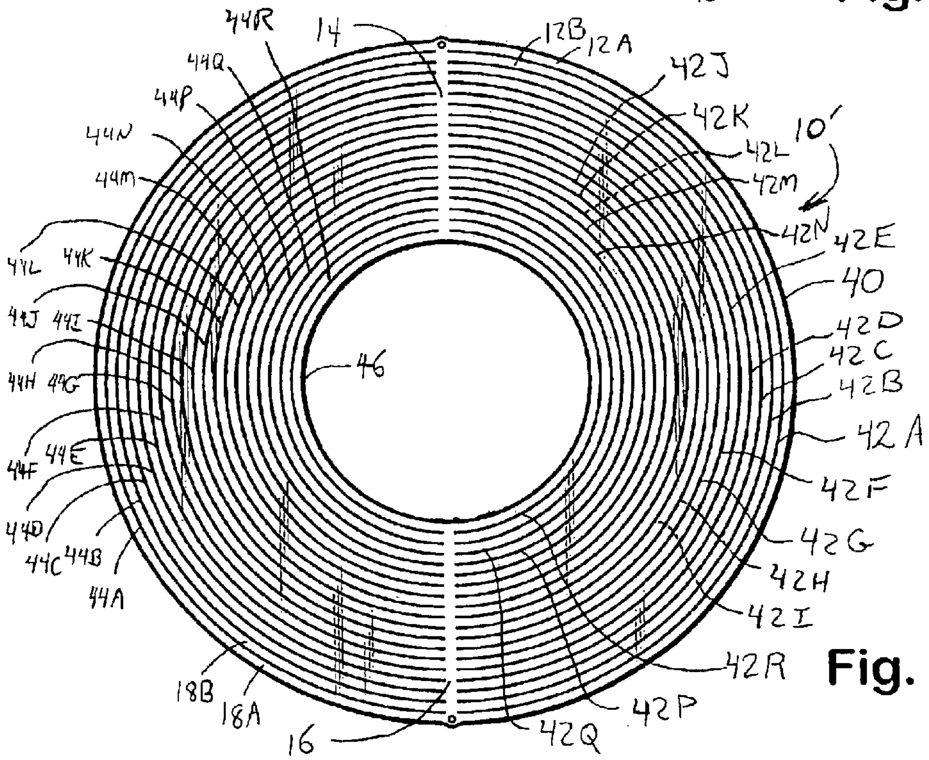
FIG. 4 is an elevational view of a cut blank sheet from which the device shown in FIG. 1 is fabricated.
Figure 5:
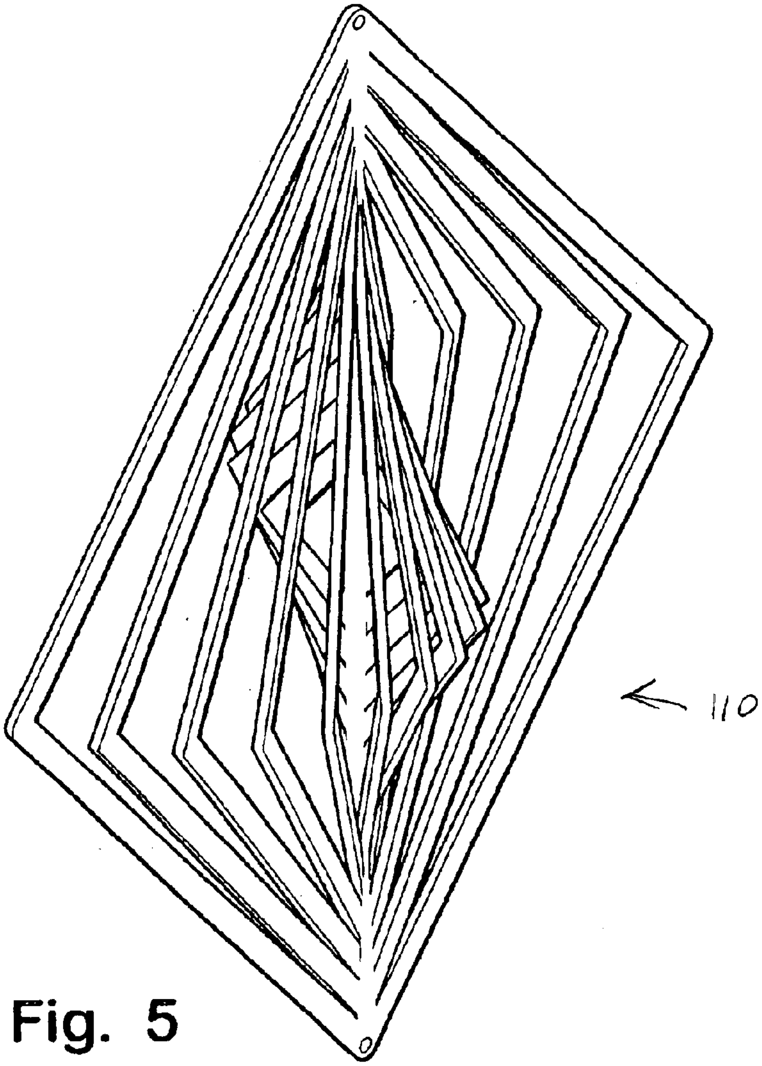
FIG. 5 is a perspective view of a second embodiment of a device according to the invention.
Figure 6:
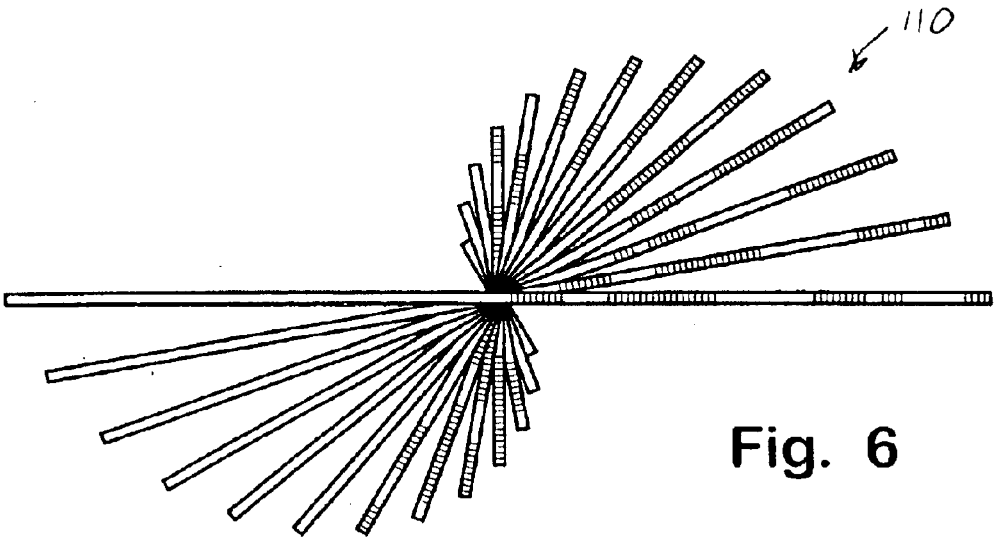
FIG. 6 is a top plane view of the device shown in FIG. 5.
Figure 7:
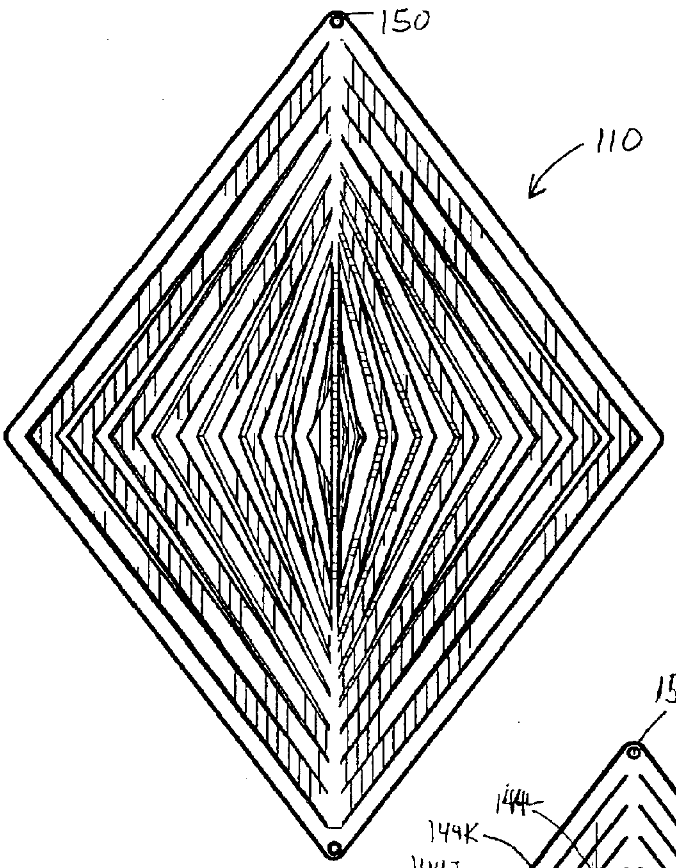
FIG. 7 is an elevational view of the device shown in FIG. 5.
Figure 8:
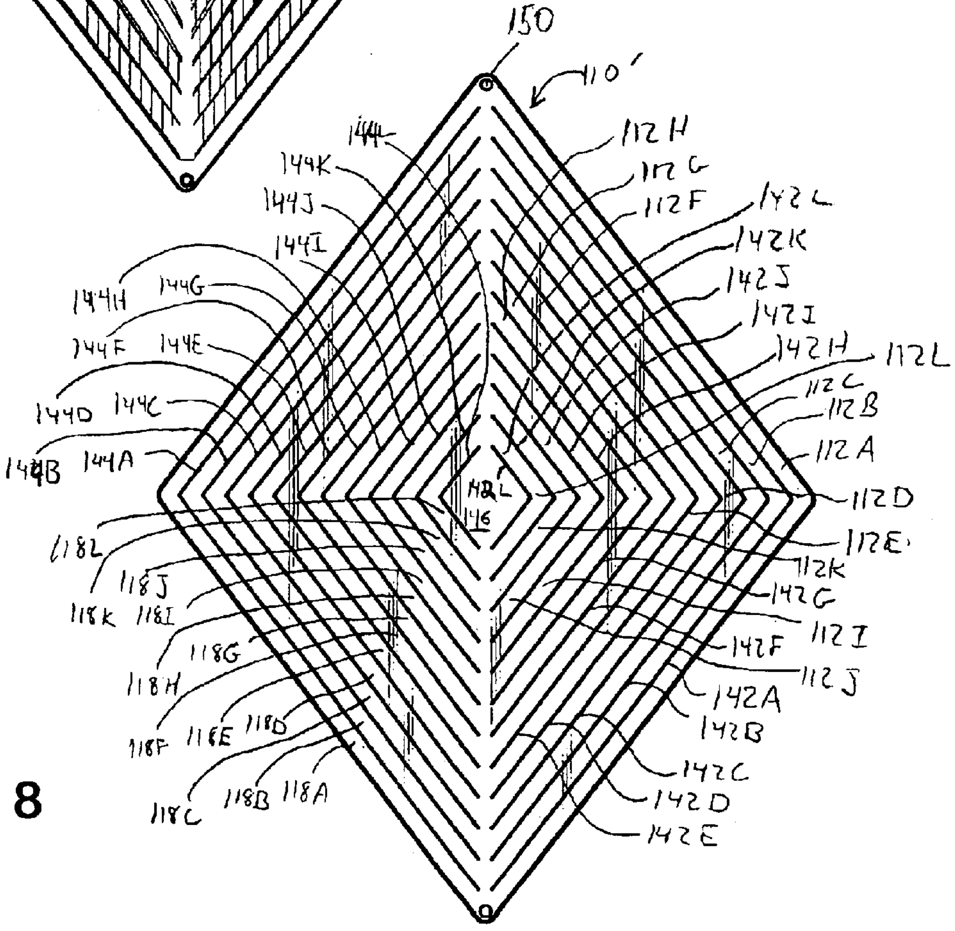
FIG. 8 is an elevational view of a cut blank sheet used for fabricating the device shown in FIG. 5.
Figure 9:
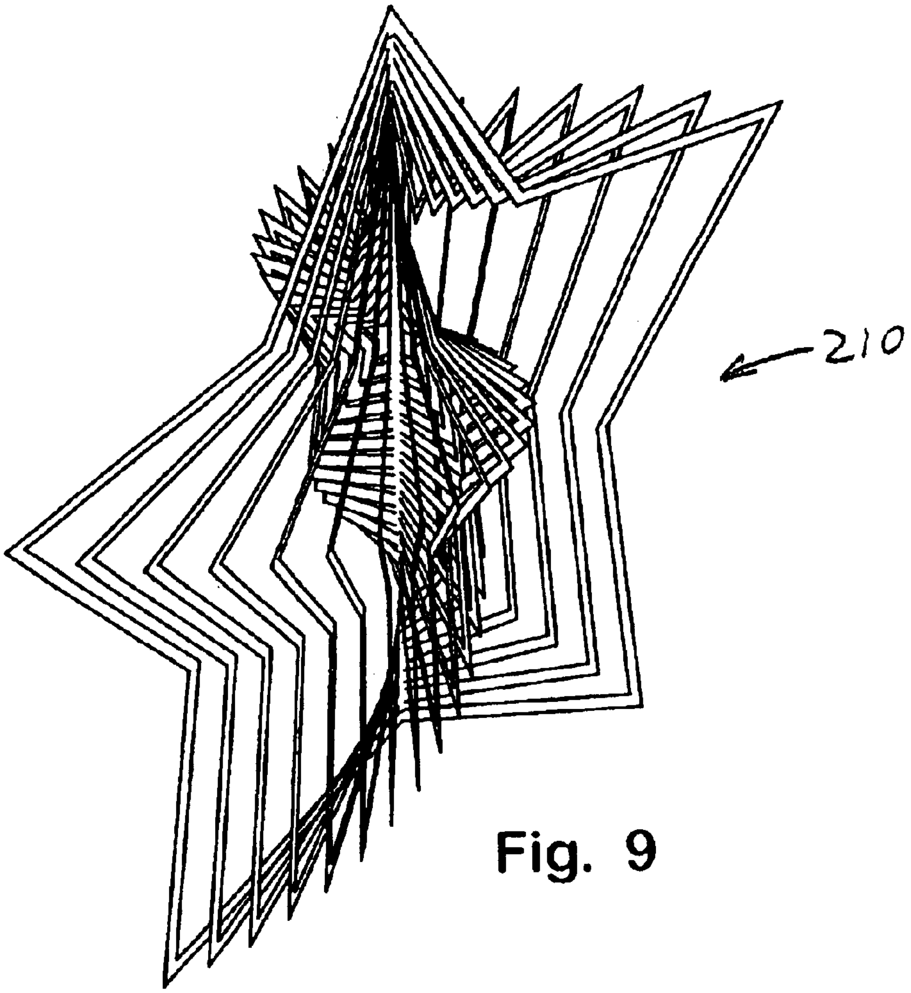
FIG. 9 is a perspective view of a third embodiment of the device according to the invention.
Figure 10:
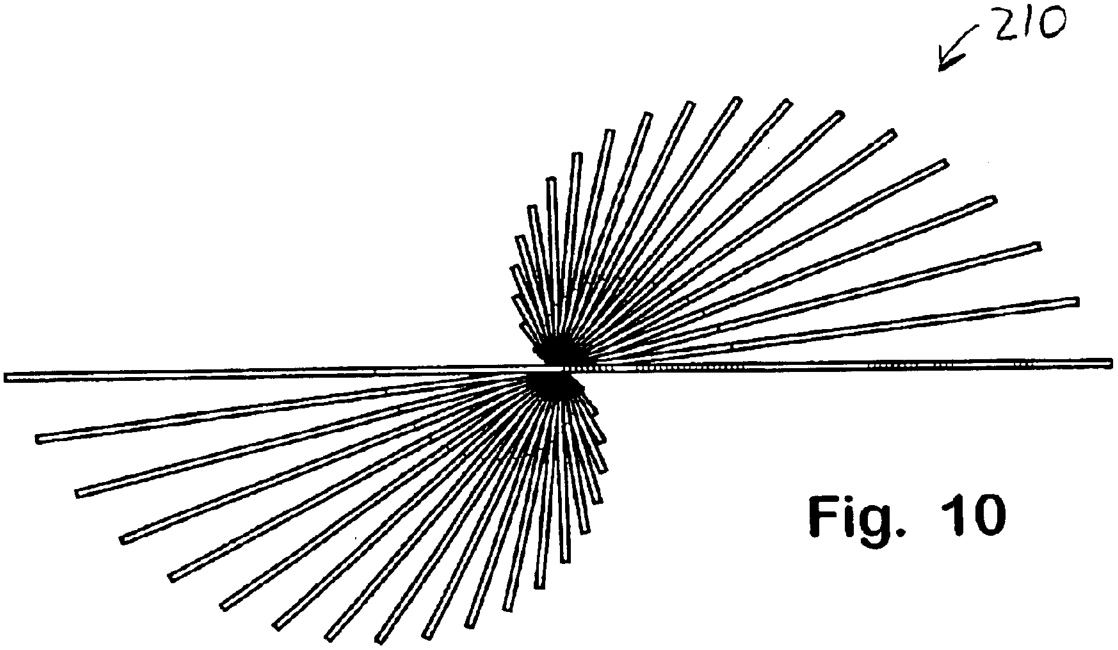
FIG. 10 is a top plane view of the device shown in FIG. 9.
Figure 11:
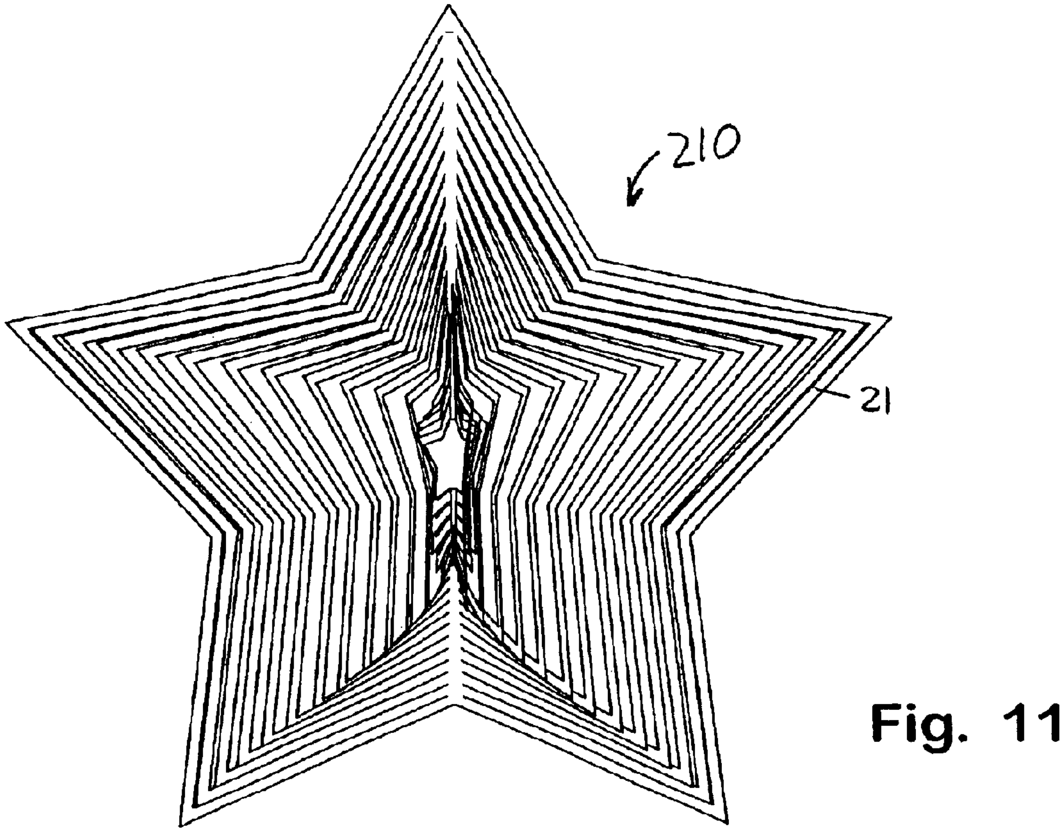
FIG. 11 is an elevational view of the device shown in FIG. 9.
Figure 12:
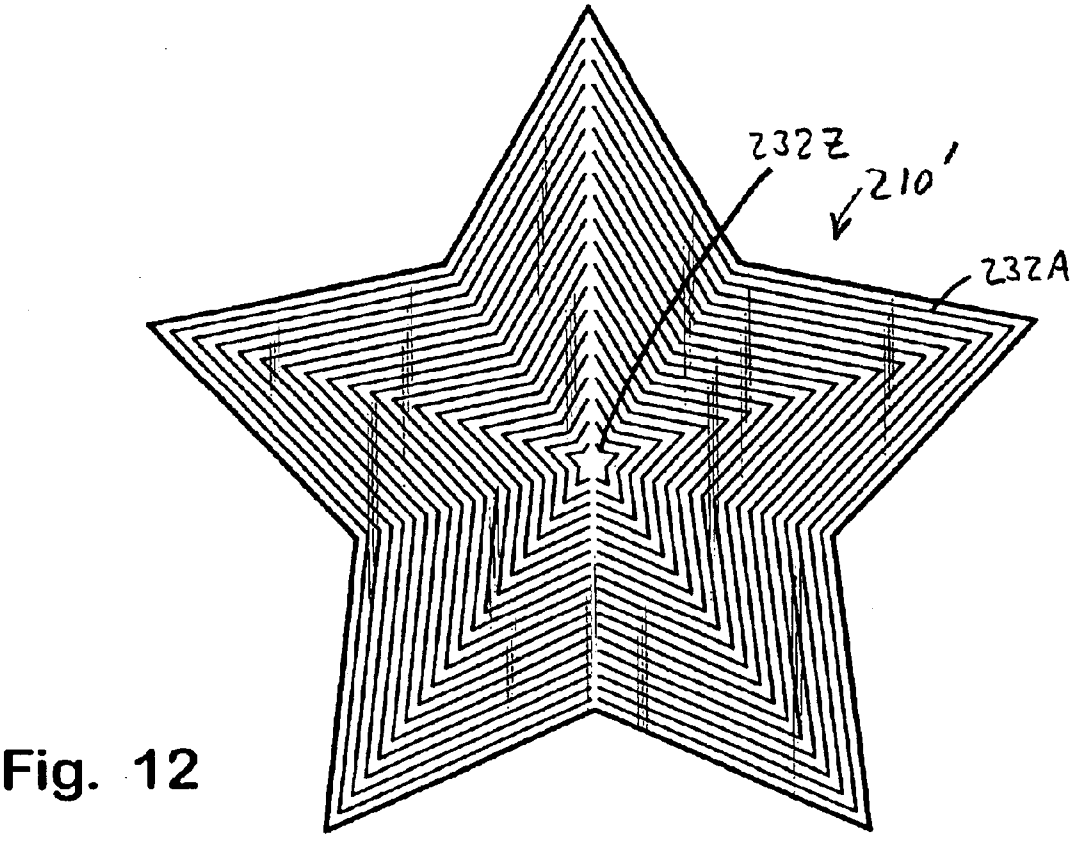
FIG. 12 is an elevational view of a cut blank sheet used for fabricating the device shown in FIG. 9.

As can be most easily seen in FIGS. 3 and 4, each of the strips 12A through 12S forms an outline of a semi-circular shape. A second series of angularly spaced apart ribs or strips 18A through 18S are also connected to spines 14 and 16. Each of the strips 18A through 18S is connected at a first end to the upper spine 14, and connected at an opposite end to the lower spine 16. As can be seen in FIGS. 1–4, each of the spines 12A through 12S is connected at one end to one edge of spine 14 and at an opposite end to one edge of spine 16, while each of the spines 18A through 18S is connected at one end to an edge of spine 14 opposite of the edge to which spines 12A through 12S are connected and the opposite end of each of spines 18A through 18S is connected at an edge of spine 16 opposite of the edge to which spines 12A through 12S are connected.

Spines 12A through 12S and spines 18A through 18S are arranged in corresponding pairs of spines with each pair of spines together forming opposite sides of a geometric shape that is uninterrupted except at spines 14 and 16. The corresponding pairs of spines (e.g., 12A and 18A through 12S and 18S) are oriented at an angle of about 180 degrees with respect to each other after the spines have been bent or otherwise angularly displaced with respect to each other as shown in FIGS. 1–3.

When device 10 is rotated about a vertical axis coincident with the long direction of spines 14 and 16, an observer viewing the rotating device from the side will see the corresponding pairs of strips (14A–12S and 18A–18S) at various different angles at any given moment. At any moment, at least one strip will be oriented approximate at an angle (edge-on) with respect to the observer's eyes such that only the edge of the strip is visible, while at the same moment another strip will be orientated at an angle of about 90 degrees (flat-on) with respect to the strip oriented edge-on with respect to the observer, and will achieve maximum visibility, i.e., the edges are substantially invisible and a major surface defined by the length and width of the strips are substantially fully visible. Strips 12A through 12S and 18A through 18S oriented at angles between the flat-on and edge-on orientation with respect to the observer are progressively less visible as the angle progresses from the flat-on to the edge-on orientation. Thus, at any given moment, or when the device 10 is stationary, the pair of corresponding strips in the flat-on orientation are more visible than the other strips and the edge-on strips are the least visible. When device 10 is rotated the strips that are most visible constantly changes. The overall visual effect is a pulsating display in which the density or solidness of device 10 appears to rapidly fluctuate, with the rate of fluctuation depending on the rotational speed of the device. It is a combination of the relative dimensions (i.e., thickness, length and wide) of the strips and their angular displacement with respect to each other that creates this unique and interesting visual effect wherein progressively longer and/or shorter strips outlining a geometric pattern become visible depending on the direction of rotation.

Although it is conceivable that device 10 could be made by molding or casting the device from a plastic material, device 10 is preferably made by cutting and bending a flat sheet of material. As shown in FIG. 4, device 10 is fabricated from sheet 10' of material that is cut into a shape having a circular periphery 40. A plurality of semi-circular cuts 42A through 42R are made on one side of the sheet, and another set of semi-circular cuts 44A through 44R are made on the other side. The cuts are made so that each cut terminates along a diagonal line passing through the center of the circular sheet 10' to define spines 14 and 16 of device 10. A central circle is cut into sheet 10' and removed to leave an inner circular periphery 46. Device 10 is completed from the cut sheet 10' shown in FIG. 4 by bending strips 12B and 18B in opposite directions so that they are located in a plane which is at an angle of about 6 degrees with respect to strips 12A and 18A. However, the angle may be larger or smaller if desired. Each of the remaining inwardly adjacent strips is bent from a reference plane by a progressively larger angle to create device 10. The best visual effects are generally achieved when the strips are angularly displaced from each adjacent strip by the same degree.

Suitable materials for sheet 10' include various metal sheet materials such as steel, copper, etc.

Device 10 is preferably supported or suspended for free rotation, such as around a vertical axis coincident with spines 14 and 16. A hook hole 50 may be provided at the upper end of spine 14 for suspending device 10 for free rotation. Free rotation can be achieved by using a swivel mechanism. Alternatively, device 10 may be mounted from the bottom onto a swivel mechanism. Device 10 may be utilized outdoors so that it rotates in the wind. As another alternative, a motor can be used for rotating device 10 indoors.

A display platform 50 may be attached, such as by welding, braising, etc., to device 10 so that device 10 may be used as a display device for displaying an ornament, candle, etc.

An alternative embodiment of a device according to the invention is shown in FIGS. 5–8. The device 110 is generally similar to device 10 except that the sheet material 110' (shown in FIG. 8) is cut into a rectangular or diamond shape and disconnected or interrupted semi-diamond shaped cuts 142A through 142L and 144A through 144L are made to form ribs or strips 112A through 112L and 118A through 118L. As can be most easily seen in FIG. 6, adjacent strips are angularly disposed with respect to each other by an angle of about 10 degrees. However, larger or smaller angles may be used, and more or fewer ribs may be used.

Another difference between device 110 and 10, aside from its shape, is that rather than cutting out and removing a portion of the sheet material from the center, a center diamond-shaped section 146 is created. Device 110 is otherwise similar to device 10, and includes a hook hole 150 for suspending device 110 for free rotation about its vertical axis whereby a unique visual effect is created during rotation.

A third alternative embodiment of a device in accordance with the invention is shown in FIGS. 9–12. The device 210 is generally similar to devices 10 and 110 except that the sheet material 210' (shown in FIG. 12) is cut into a fivepointed star shape and disconnected or interrupted semi-star-shaped cuts 232A through 242T are made to form ribs or strips 212A through 212T and 218A through 218T.

The above description is considered that of the preferred embodiments only. Modifications of the invention will occur to those skilled in the art and to those who make or use the invention. Therefore, it is understood that the embodiments described above are merely for illustrative purposes and are not intended to limit the scope of the invention, which is defined by the following claims as interpreted according to the principles of patent law, including the doctrine of equivalents.

The invention claimed is:

1. A three-dimensional ornamental device comprising:

a spine having a single vertical axis, a series of spaced-apart, progressively longer, elongate strips, and a reference elongate strip, wherein each elongate strip in the series outlines a similar two-dimensional shape, wherein the two-dimensional shape of each elongate strip in the series is concentric to the two-dimensional shape of an adjacent elongate strip, wherein each elongate strip in the series has a length, a width, a thickness, and a major surface defined by the length and the width of the elongate strip, wherein the length of each elongate strip in the series is greater than the width of the elongate strip and the width of the elongate strip is greater than the thickness of the elongate strip, wherein the major surface of each elongate strip in the series is located in a vertical plane different from the vertical plane of an adjacent elongate strip in the series, wherein the vertical planes of the major surfaces of the elongate strips in the series intersect at the single vertical axis, wherein the reference elongate strip outlines a similar two-dimensional shape to each elongate strip in the series, the two-dimensional shape of the reference elongate strip is concentric to the two-dimensional shape of an adjacent elongate strip in the series, the reference elongate strip has a length, a width, a thickness, and a major surface defined by the length and the width of the reference elongate strip, the length of the reference elongate strip is greater than the width of the reference elongate strip and the width of the reference elongate strip is greater than the thickness of the reference elongate strip, the length of the reference elongate strip is less than the length of any elongate strip in the series, the major surface of the reference elongate strip is located in a vertical plane different from the vertical plane of an adjacent elongate strip in the series, and the vertical plane of the major surface of the reference elongate strip intersects at the single vertical axis, and wherein the vertical plane of the major surface of each progressively longer elongate strip in the series is angularly displaced by a progressively larger angle from the vertical plane of the major surface of the reference elongate strip.

2. The device of claim 1, wherein the device is made of metal sheet.

3. The device of claim 1, wherein adjacent strips are angularly displaced from each other by a progressively larger angle.

4. The device of claim 1, wherein adjacent strips are angularly displaced from each other by approximately the same angle.

5. The device of claim 1, wherein the spine includes an aperture for suspending the device for free rotation.

6. A three-dimensional ornamental device comprising:

a first series of angularly spaced apart strips, each strip having opposite ends and a length corresponding to the distance along the strip between the opposite ends of the strip, each strip connected at one end to a first vertical spine and at the opposite end to a second vertical spine, each strip in a different vertical plane; and a second series of angularly spaced apart strips, each strip having opposite ends and a length corresponding to the distance along the strip between the opposite ends of the strip, each strip connected at one end to the first spine and at the opposite end to the second spine, each strip in the first series corresponding with one of the strips in the second series, the corresponding pairs of strips being angularly displaced by about 180 degrees and connected on opposite sides of the spines to outline two sides of a geometric shape separated by the spines;

wherein each successive adjacent strip is displaced from a reference plane by a progressively larger angle.

7. The device of claim 6, wherein the device is made of metal sheet.

8. The device of claim 6, wherein adjacent strips are angularly displaced from each other by approximately the same angle.

9. The device of claim 6, wherein the first spine includes an aperture for suspending the device for free rotation.

* * * * *